(12) United States Patent
Yamawaki et al.

(10) Patent No.: US 6,727,608 B2
(45) Date of Patent: Apr. 27, 2004

(54) CLAW-POLE TYPE STEPPING MOTOR

(75) Inventors: Takayuki Yamawaki, Shizuoka-ken (JP); Hiroshi Sano, Shizuoka-ken (JP); Toshihiko Nagata, Shizuoka-ken (JP)

(73) Assignee: Minebea Co, Ltd., Nagano-ken (JP)

( * ) Notice: Subject to any disclaimer, the term of this patent is extended or adjusted under 35 U.S.C. 154(b) by 0 days.

(21) Appl. No.: 10/157,336

(22) Filed: May 28, 2002

(65) Prior Publication Data

US 2002/0180302 A1 Dec. 5, 2002

(30) Foreign Application Priority Data

May 29, 2001 (JP) ........................................ 2001-160208

(51) Int. Cl.⁷ .............................................. H02K 37/24
(52) U.S. Cl. ................. 310/49 R; 310/156.71
(58) Field of Search ........................ 310/49 R, 156.66, 310/156.71

(56) References Cited

U.S. PATENT DOCUMENTS 5,283,487 A * 2/1994 Oki et al. ..................... 310/49

FOREIGN PATENT DOCUMENTS

JP          2000-050536      *  2/2000

* cited by examiner

*Primary Examiner*—Nicholas Ponomarenko
*Assistant Examiner*—Iraj A. Mohandesi
(74) *Attorney, Agent, or Firm*—William Michael Hynes; Townsend and Townsend and Crew LLP

(57) ABSTRACT

A claw-pole type stepping motor which includes a stator in which coils are arranged in association with a pair of inner and outer yokes and a pair of pole tooth sections thereby forming a magnetic circuit; and a rotor magnet which is rotatably disposed opposite to the pair of pole tooth sections, each of the pair of pole tooth sections being prepared discretely from each of the inner and outer yokes by punching out a soft magnetic steel plate so as to form a piece having a belt portion and a plurality of pole teeth integrally connected to the belt portion and thereafter rolling into a cylindrical shape. Thus, it becomes possible to set arbitrarily individual dimensions of each of the pole teeth as required by the characteristics of a motor, thereby providing an excellent high output and miniature motor.

19 Claims, 6 Drawing Sheets

CLAW-POLE TYPE STEPPING MOTOR

BACKGROUND OF THE INVENTION

1. Field of the Invention:

The present invention relates to a claw-pole type stepping motor, and particularly to a stator structure of a claw-pole type stepping motor for realizing the miniaturization and high efficiency of the motor and also the simple and easy manufacture of the motor.

2. Related Art:

In recent years, various devices have been coming out with miniaturization and high efficiency, and this trend keeps going on. However, although sufficient space a s a whole is provided in devices such as a laptop computer, the height space is limited, and high performance characteristics are required for the motor.

A claw-pole type stepping motor is capable of high precision position control with a comparatively simple structure, but it is difficult to reduce the size (diameter) of such a motor. This arises mainly from the formation of the teeth of claw poles.

Figure 1A:
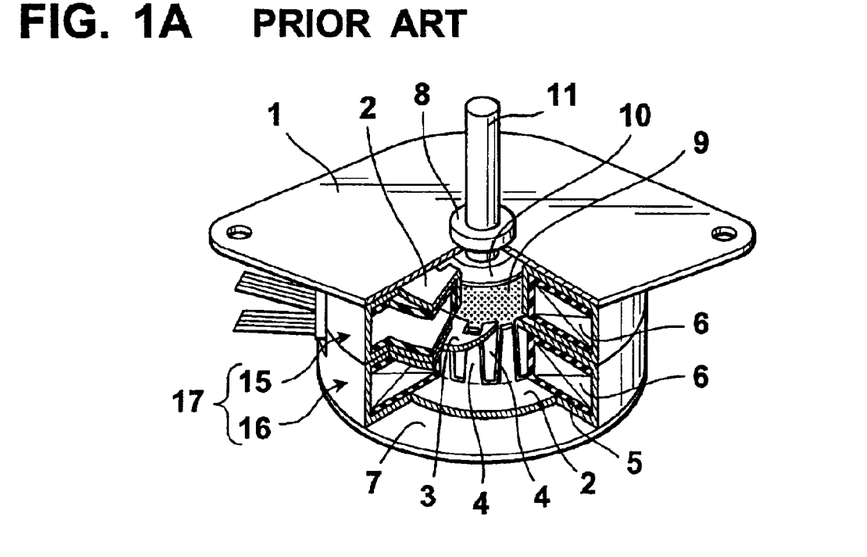
FIG. 1A is a partially cut away perspective view of the motor.
Figure 1B:
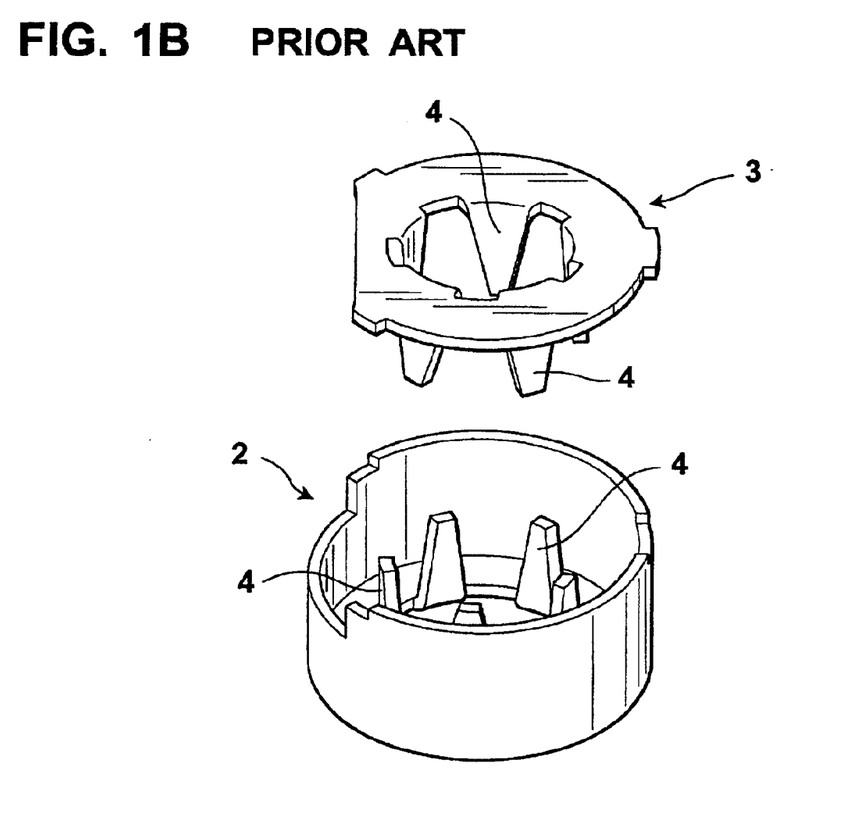
FIG. 1B is an exploded perspective view of a pair of inner and outer yokes and a pair of pole tooth sections that are main parts of the stator structure.

FIG. 1A is a partially cut away perspective view showing a conventional claw-pole type stepping motor, and FIG. 1B is an exploded perspective view of yokes with pole teeth that are main portions of a stator.

In FIG. 1A, reference numeral 1 denotes a flange for motor attachment, and an outer yoke 2 and an inner yoke 3 are each manufactured by punching and drawing a soft magnetic steel plate, each of the yokes 2 and 3 having at its inner circumferential side a plurality of pole teeth 4 formed by bending. Coils 6 formed by winding magnetic wires around bobbins 5 are each arranged at an equal interval in an annular space between the outer yoke 2 and the inner yoke 3. Respective pole teeth 4 of the outer and inner yokes 2 and 3 are displaced by an electrical angle of 180°, and from a magnetic circuit together with the coil 6, thus constructing each of an A phase stator 15 and a B phase stator 16. The A phase and B phase stators 15 and 16 thus constructed are coupled together back to back such that their respective pole teeth 4 are displaced by an electrical angle of 90°, thereby forming a stator assembly 17. A lower flange 7 has a bearing (not shown) at its center and is attached to the outer yoke 2 of the B phase stator 16. Reference numeral 9 represents a rotor magnet, and a sleeve 10 joins the rotor magnet 9 to a shaft 11.

As can be seen in FIG. 1B, the plurality of pole teeth 4 are formed in the outer yoke 2 and inner yoke 3, respectively, by bending the pole teeth after integrally forming them at the time of machining the respective yokes. Accordingly, since the pole teeth 4 are made of the same material of a section corresponding to a hole formed in the center of each of the yokes, it is extremely difficult to arbitrarily set the length and thickness of each pole tooth 4. For example, if the motor diameter is made small, it is difficult to obtain each pole tooth of sufficient length. For this reason, a claw-pole type stepping motor tends not to be mounted in a thin device in which only a motor having a very small diameter can be used.

To solve this problem, a structure where pole teeth are parts manufactured discretely from the yokes has been proposed and an example is disclosed in Japanese Patent Application Laid-open No. 2000-050536. However, since this solution proposes that each individual pole tooth should be manufactured and assembled discretely from other pole teeth and from the yokes, it is not feasible method and structure to adapt for a practical motor, because it requires a great deal of labor and cost to manufacture this type of motor.

Therefore, with a claw-pole type stepping motor of the related art, each of the pole teeth 4 of the outer yoke 2 and inner yoke 3 are integrally formed with their respective yokes. However, in order to secure sufficient space for coils, the smaller a motor diameter becomes the thinner the plate has to be. As a result, from the point of view of strength as well as magnetic characteristics, it is very difficult to form satisfactory pole teeth. For this reason, instead of using a claw-pole type stepping motor, a brushless DC motor is used. However, in this case, it is necessary to add an encoder as a position detector just to control its position. As a result, the structure of the brushless DC motor becomes expensive.

Nevertheless, in an environment surrounding the stepping motor, a high performance magnet such as a rare earth magnet has been developed as the material of a rotor magnet facing the stator, and only if a satisfactory structure of a stator can be found out, will it be possible to provide a motor with improved characteristics, and its appropriate structure is therefore expected.

SUMMARY OF THE INVENTION

The present invention has been made in view of the above-described circumstances in the prior art, and has for its aim to provide a claw-pole type stepping motor capable of being mounted in a thin device and being manufactured easily, and at the same time to provide a stator structure capable of dealing with a high output motor.

In order to achieve the above-described aim, according to a main aspect of the present invention, there is provided a claw-pole type stepping motor comprising: a stator in which coils are arranged in association with a yoke unit made of soft magnetic steel and consisting of an inner yoke and an outer yoke, each having a round hole at its center, and a of pole tooth sections made of soft magnetic steel thereby forming a magnetic circuit; and a rotor magnet which is rotatably disposed opposite to the pair of pole tooth sections of the stator, each of the pair of pole tooth sections being prepared discretely from each of the inner and outer yokes by punching out a soft magnetic strip steel plate so as to form a piece having a belt portion and a plurality of pole teeth integrally connected to the belt portion and thereafter rolling into a cylindrical shape.

The above-described stepping motor of the main aspect also has the following subsidiary aspects:

(a) In the stepping motor of the main aspect, each of the pole tooth sections is inserted into the round hole of each of the yokes and is fixed to an inner circumferential surface defining the round hole of each of the yokes.

(b) In the stepping motor of the main aspect, fixing each of the pole tooth sections to an inner circumferential surface defining the round hole of each of the yokes is achieved by press-fitting the pole tooth section into the round hole.

(c) In the stepping motor of the main aspect, fixing each of the pole tooth sections to an inner circumferential surface defining the round hole of each of the yokes is achieved by welding the pole tooth section to the yoke.

(d) In the stepping motor of the main aspect, fixing each of the pole tooth sections to an inner circumferential surface defining the round hole of each of the yokes is achieved by pouring mold resin into a gap in an assembled body of the yoke and the pole tooth section. (e) In the stepping motor of the main aspect, protuberances facing the inside of the round hole are formed at appropriate places of an inner circumferential surface defining the round hole of each of the yokes, so that the protuberances engage fixedly with engaging portions of each of the pole tooth sections when joining the yokes with the pole tooth sections, respectively.

(f) In the stepping motor of the main aspect, protuberances facing the inside of the round hole are formed at appropriate places of an inner circumferential surface defining the round hole of each of the yokes, and notches are cut in appropriate places of a side of the belt portion of each of the pole tooth sections opposite to another side of the belt portion where the plurality of pole teeth are formed, so that the protuberances engage fixedly with the notches when joining the yokes with the pole tooth sections, respectively.

(g) In the stepping motor of the main aspect, notches are cut in appropriate places of an inner circumferential surface defining the round hole of each of the yokes, and protuberances are formed at appropriate places of a side of the belt portion of each of the pole tooth sections opposite to another side of the belt portion where the plurality of pole teeth are formed, so that the protuberances engage fixedly with the notches when joining the yokes with the pole tooth sections, respectively.

(h) In the stepping motor of the subsidiary aspects (f) and (g), the protuberances and notches are respectively formed at at least two places diametrically opposed so as to engage with each other.

As it is clear from the above aspects, according to the stepping motor of the present invention, the pole teeth of the soft magnetic steel facing the rotor magnet are prepared discretely from each of the inner and outer yokes, and the soft magnetic strip steel plate is punched out to form the pole tooth section having a belt portion and a plurality of pole teeth integrally connected to the belt portion, and the pole tooth section is rolled into a cylindrical shape. As a result, individual dimensions of each of the pole teeth (length, width, plate thickness, etc.) can be arbitrarily set as required by the characteristics of the motor, which can realize a miniature motor that develops high output. Moreover, the present invention makes it possible to reduce the number of parts and to easily assemble the motor.

The above and many other aims, features and advantages of the present invention will become manifest to those skilled in the art upon making reference to the following detailed description and accompanying drawings in which the preferred embodiments incorporating the principle of the present invention are shown by way of illustrative examples.

BRIEF DESCRIPTION OF THE DRAWINGS

FIGS. 1A and 1B respectively show a conventional claw-pole type stepping motor and a stator structure of the related art, in which

FIGS. 2A and 2B respectively show a claw-pole type stepping motor and a stator structure of the present invention, in which

FIGS. 3A and 3B respectively show a pole tooth section used in the stepping motor of the present invention, in which

FIGS. 8A to 8D show a fifth embodiment of a positioning method in the stator structure of the present invention when fixing a pole tooth section to an inner yoke, in which

DETAILED DESCRIPTION OF THE PREFERRED EMBODIMENTS

Preferred embodiments of the present invention will be described hereinafter with reference to the accompanying drawings.

In the drawings, sections that are the same as or equivalent to the conventional embodiment shown in FIGS. 1A and 1B are shown by the same reference alphanumeric characters, and therefore detailed descriptions thereof are omitted.

Figure 2A:
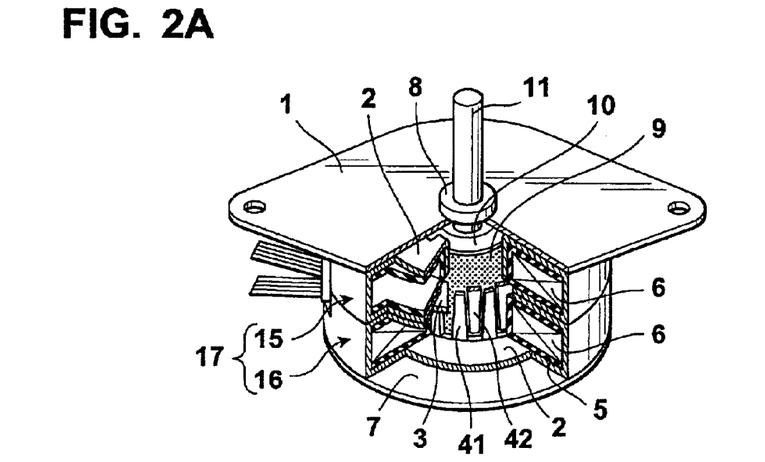
FIG. 2A is a partially cut away perspective view of the motor.
Figure 2B:
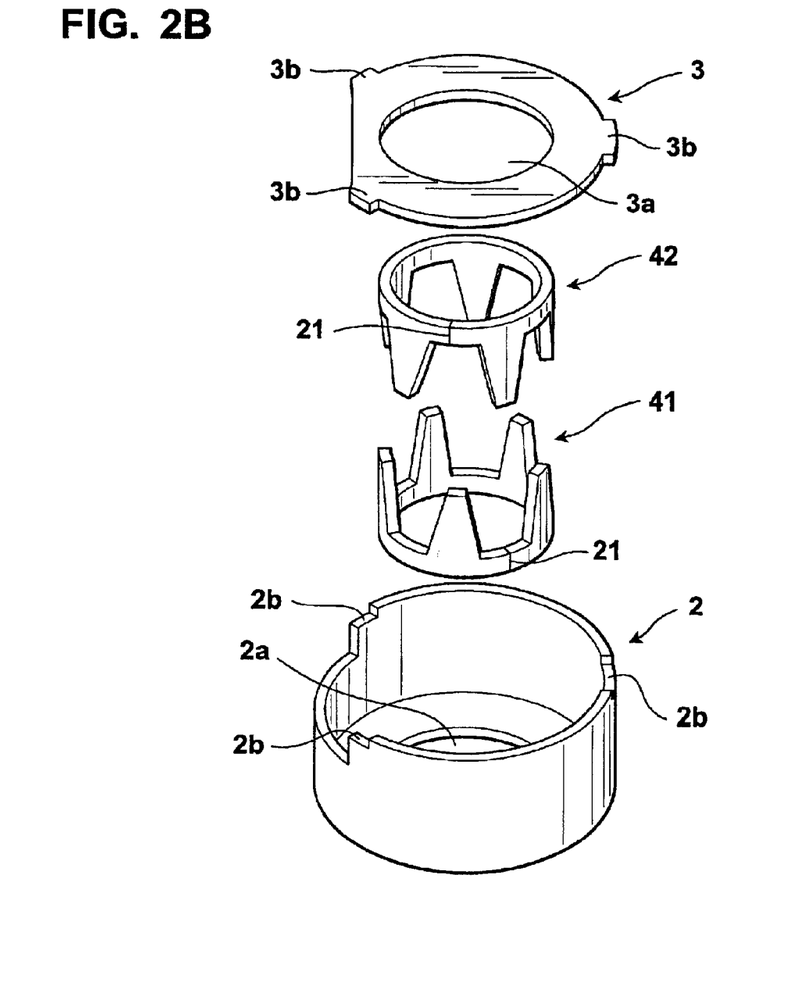
FIG. 2B is an exploded perspective view showing a pair of inner and outer yokes and a pair of pole tooth sections that are main parts of the stator structure.

FIGS. 2A and 2B respectively show an embodiment of a claw-pole type stepping motor of the present invention, in which FIG. 2A is a partially cut away perspective view of the motor, and FIG. 2B is an exploded perspective view showing a pair of pole tooth sections 41, 42 and a yoke unit consisting of outer and inner yokes 2 and 3.

The schematic structure of the stator of the present invention is as described in the following.

Figure 3A:
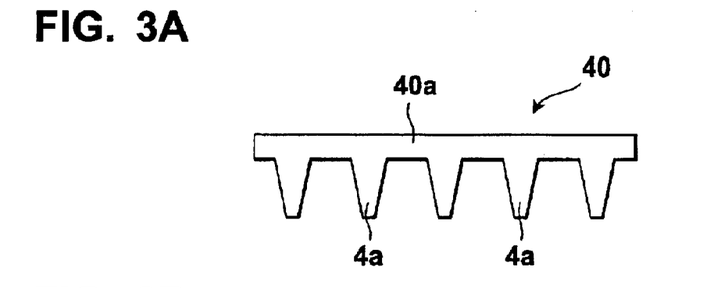
FIG. 3A is a plan view of a belt-shaped and toothed piece having pole teeth manufactured by punching out a soft magnetic strip steel plate.
Figure 3B:
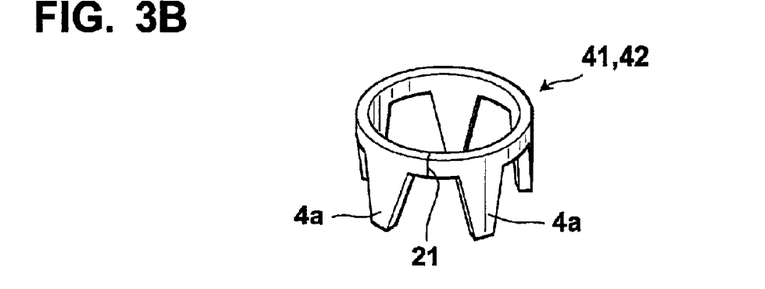
FIG. 3B is a perspective view of a pole tooth section manufactured from the belt-shaped and toothed piece having pole teeth shown in FIG. 3A.

As it is understood from FIG. 2B, pole teeth are not formed integrally with an outer yoke 2 and an inner yoke 3, and instead only round holes 2a and 3a for the respective attachments of pole tooth sections 41 and 42 are formed in the yokes 2 and 3, respectively. The pole tooth sections 41 and 42 each having pole teeth are manufactured independently of the yokes 2 and 3. The pole tooth sections 41 and 42 of this embodiment are formed cylindrically after punching out a soft magnetic strip steel plate. That is, the cylindrical pole tooth sections 41 and 42 are made as follows. In the first step, as shown in FIG. 3A, the soft magnetic strip steel plate 40a such as a galvanized strip steel plate is punched out so as to form a belt-shaped and toothed piece 40 having a belt portion and a plurality of pole teeth 4a integrally connected to the belt portion and positioned at equal intervals in the first step. The shape of each of the pole teeth 4a is approximately triangular or trapezoidal. In the second step, as shown in FIG. 3B, the pole tooth sections 41 and 42 are obtained by rolling the belt-shaped and toothed piece 40 into a cylindrical shape with both ends of each piece joined. Reference numeral 21 represents a break (a joint).

For the respective pole tooth sections to be formed, as shown in FIG. 2B, the pole tooth section 41 for the outer yoke 2 and the pole tooth section 42 for the inner yoke 3 are prepared, and then they are respectively inserted into a round hole 2a formed in the outer yoke 2 and a round hole 3a formed in the inner yoke 3, and are respectively fixed to an inner circumferential surface forming the round hole 2a of the outer yoke 2 and an inner circumferential surface forming the round hole 3a of the inner yoke 2.

Figure 4:
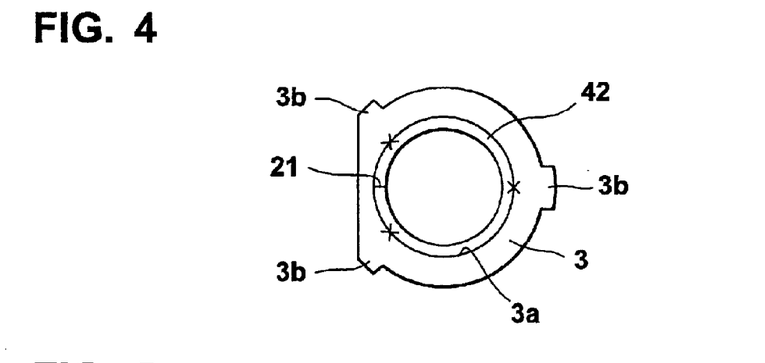
FIG. 4 is a plan view showing a first embodiment of a positioning method when fixing a pole tooth section to an inner yoke in the stator structure of the present invention.

FIG. 4 is a plan view of the pole tooth section 42 mounted to the inner yoke 3 through the round hole 3a. The pole tooth section 42 can be fixed to the inner yoke 3 by an elastic return force due to the inherent springiness of the material, or fixed by forcing the pole tooth section into the round holes 3, depending on the intended use of the motor. In this connection, it is more effective to weld them in order to increase fixing reliability (the symbol character "x" in FIGS. 4 and 5 represents each welding point).

Referring to FIG. 2B again, the pole tooth section 41 is also fixed to the inner circumferential surface forming the round hole 2a of the outer yoke 2 in a similar manner. In order to make a magnetic circuit, a bobbin 5 (not shown in FIG. 2B) on which a coil is wound is mounted onto the periphery of the pole tooth section 41. Further, protuberances 3b formed at certain points on the edge of the inner yoke 3 and indentations 2b formed at the corresponding points on an upper edge of the outer yoke 2 are positioned so that they fit right in with each other. Still further, the outer yoke 2 is superposed on the inner yoke 3. Thus, a stator can be assembled.

Next, a positioning method for fitting the pole tooth sections on the inner and outer yokes, respectively, will be described using the inner yoke 3 as an example.

Figure 5:
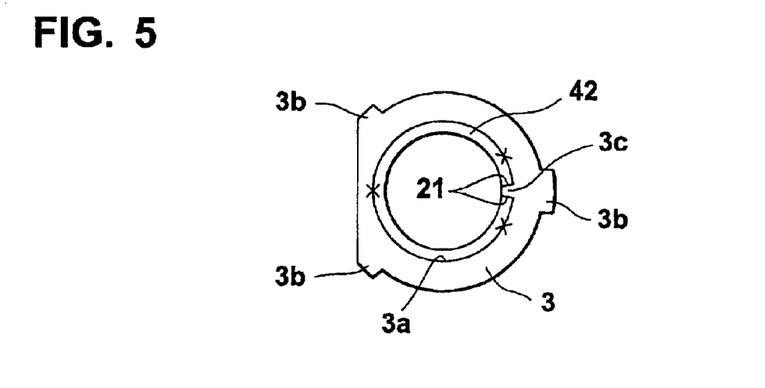
FIG. 5 is a plan view showing a second embodiment of a positioning method when fixing the pole tooth section to an inner yoke in the stator structure of the present invention.

FIG. 5 shows a first embodiment of a positioning method of the present invention. In FIG. 5, in the same way as shown in FIG. 4, the state where the pole tooth section 42 is fitted in the yoke 3 through the round hole 3a is shown in plan view.

A protuberance 3c is provided at a certain point of the circumferential surface forming the round hole 3a of the inner yoke 3, and when the pole tooth section 42 is fitted in the yoke 3 through the round hole 3a, it is possible to position the pole tooth section 42 at the right point along the circumference of the round hole 3 in order to cause the protuberance 3c to bite into a break 21 of the pole tooth section 42.

As described above, pole teeth of the pole tooth section 42 fitted in the inner yoke 3 and those of the pole tooth section 41 fitted in the outer yoke 2 must be alternately aligned back to back at intervals of an electrical angle of 180° along the respective circumferential directions of the yokes. At this time, as shown in FIG. 2B, positioning of the outer yoke 2 and the inner yoke 3 in the circumferential direction is achieved by causing the protuberance 3b formed on the inner yoke 3 to engage with the indentation 2b formed in the outer yoke 2. Accordingly, by appropriately determining the position of the protuberance 3c provided at a certain point on the inner yoke 3, when seeking to cause this protuberance 3c to engage with the break 21 of the pole tooth section 42, it becomes easy to just position both the pole tooth section 41 of the outer yoke 2 and the pole tooth section 42 of the inner yoke 3, each at an electrical angle of 180°.

Figure 6A:
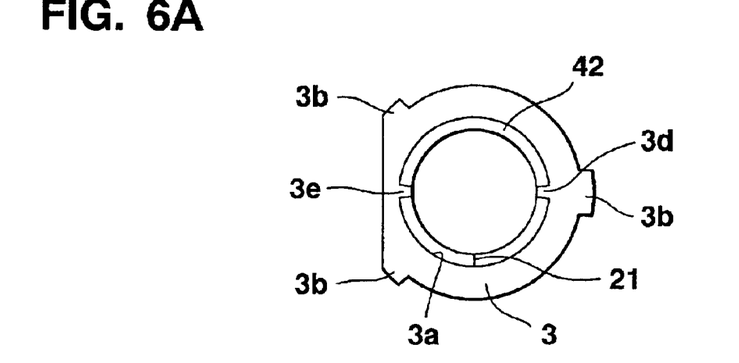
FIGS. 6A and 6B show a third embodiment of a positioning method in the stator structure of the present invention when fixing a pole tooth section shown in the expanded side elevation view of FIG. 6B to an inner yoke shown in the plan view of FIG. 6A.
Figure 6B:
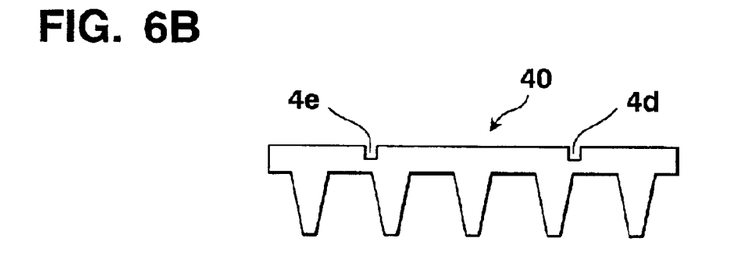

A second embodiment of a positioning method when fixing the pole tooth section to the inner yoke is shown in FIGS. 6A and 6B.

In this second embodiment, two protuberances 3d and 3e are provided along an inner circumferential surface forming the round hole 3a of the inner yoke 3 at positions diametrically opposite to each other (opposite with the center of the round hole 3a as a center), while two notches 4d and 4e are formed in a belt-shaped and toothed piece 40 (which is shown in FIG. 6B as an expanded view so as to facilitate the understanding), each at an interval equal to the interval between the two protuberances 3d and 3e. When seeking to fit the pole tooth section 42 in the inner yoke 3, it is possible to always keep the same positional relationship between the inner yoke 3 and the pole tooth section 42 in the circumferential direction of the round hole 3a by causing the protuberances 3d and 3e of the inner yoke 3 to engage with the notches 4d and 4e of the pole tooth section 42. At the same time, it is also possible to keep constant the positional relationship between the inner yoke 3 and the pole tooth section 42 in the axial direction thereof by causing the protuberances 3d and 3e to engage with the notches 4d and 4e.

Figure 7A:
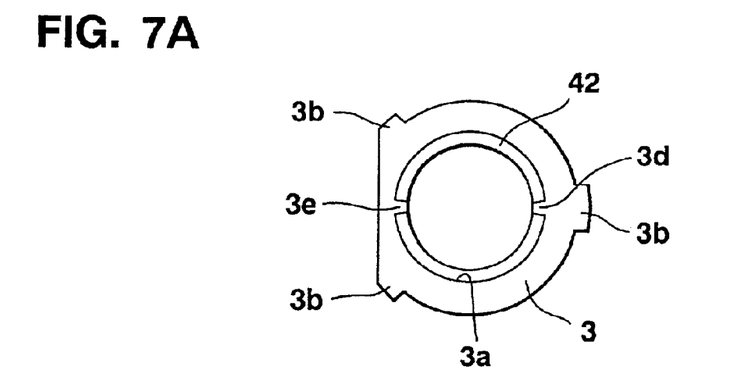
FIGS. 7A and 7B show a fourth embodiment of a positioning method in the stator structure of the present invention when fixing a pole tooth section shown in the expanded side elevation view of FIG. 7B to a n inner yoke shown in the plan view of FIG. 7A.
Figure 7B:
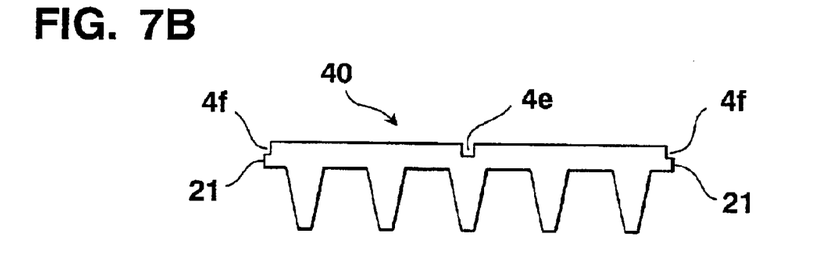

FIGS. 7A and 7B show a third embodiment of a positioning method which is a further development of the positioning method. Although this embodiment is the same as the second one shown in FIGS. 6A and 6B in that two protuberances 3d and 3e are provided on an inner circumferential surface of the round hole 3a of the inner yoke 3, it is different from the second embodiment in that one notch 4f out of the two notches provided in the band-shaped and toothed piece 40 is made at the break 21 of the pole tooth section 42, while the other notch 4e is made in the center of a common base line surface of the band-shaped and toothed piece 40.

In this third embodiment, since the notch 4f is made at the break 21 of the pole tooth section 42 which is an unstable portion, the whole of the pole tooth section 42 having the notch 4f at its break 21 becomes more stable by causing the protuberance 3d to engage with the notch 4f.

A fourth embodiment of the positioning method for fixing the pole tooth section to the inner yoke is shown in FIGS. 8A to 8D.

Figure 8A:
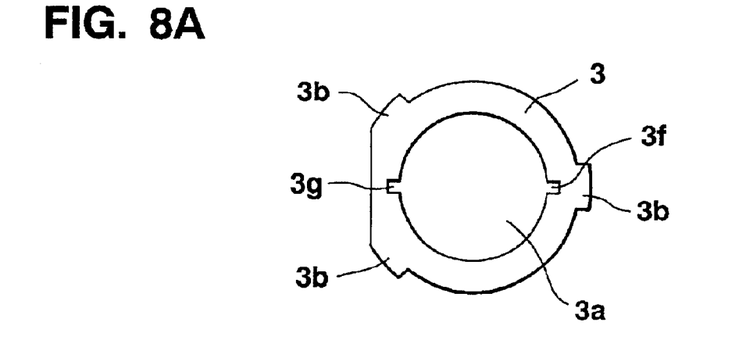
FIG. 8A is a plan view of the inner yoke.
Figure 8B:
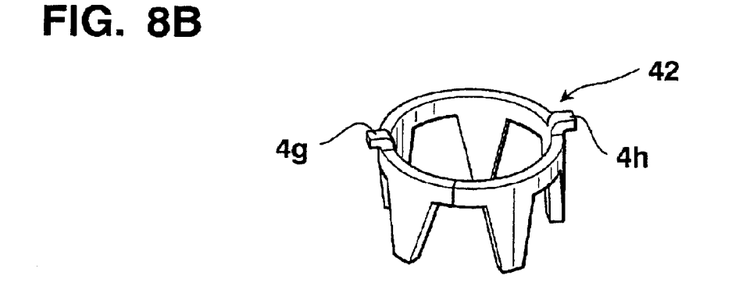
FIG. 8B is a perspective view of a pole tooth section.
Figure 8C:
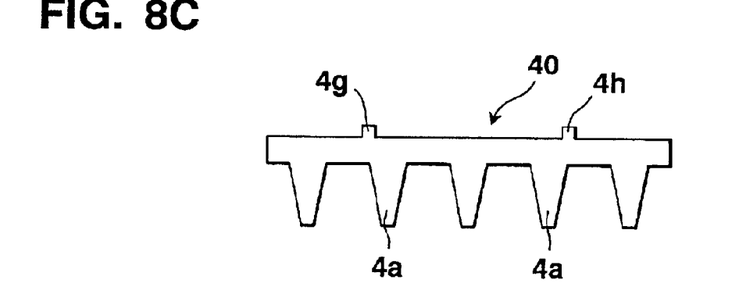
FIG. 8C is an expanded si de elevation view of a belt-shaped piece having pole teeth.

FIG. BA is a plan view of the inner yoke 3. Notches 3f and 3g are made in an inner circumferential surface forming the round hole 3a of the inner yoke 3 at positions diametrically opposite to each other (opposite with the center of the round hole 3a as a center), and protuberances 4g and 4h, as shown in FIG. 8B, are formed on a common base line surface of the pole tooth section 42 at positions diametrically opposite to each other. Firstly, this pole tooth section 42 can be manufactured by punching out a soft magnetic strip steel plate to form a belt-shaped and toothed piece 40, as shown in FIG. 8c, having protuberances 4g and 4h separated from each other on a common base line surface. Successively, as shown in FIG. 8B, this belt-shaped and toothed piece 40 is made into a cylindrical shape by joining both ends thereof. After that, the protuberances 4g and 4f are bent outside, so that the pole tooth section 42 with the protuberances 4g and 4h can be manufactured.

Figure 8D:
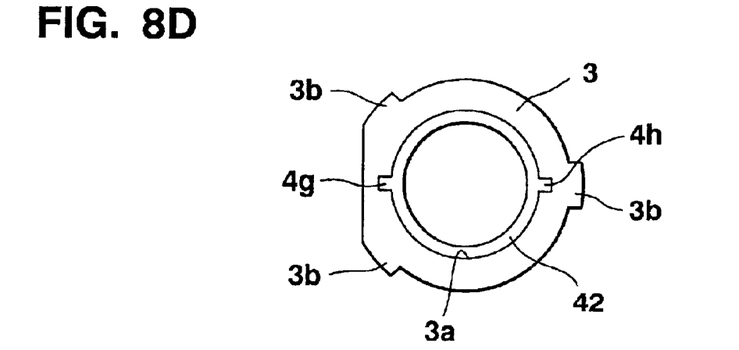
FIG. 8D is a plan view showing an assembled state of the pole tooth section and the inner yoke.

FIG. 8D shows the state where the pole tooth section 42 having the above-described structure is fitted in the inner yoke 3 through the round hole 3. It is possible to achieve positioning between the inner yoke 3 and the pole tooth section 42 in the circumferential direction of the round hole 3a by engaging the protuberances 4g and 4h of the pole tooth section 42 with the notches 3g and 3f of the inner yoke 3.

The above description is in connection with some embodiments, in each of which the pole tooth section 42 is fitted in the inner yoke 3, and the description can apply also to the pole tooth section 41 of the outer yoke 2 in the same way.

Figure 9:
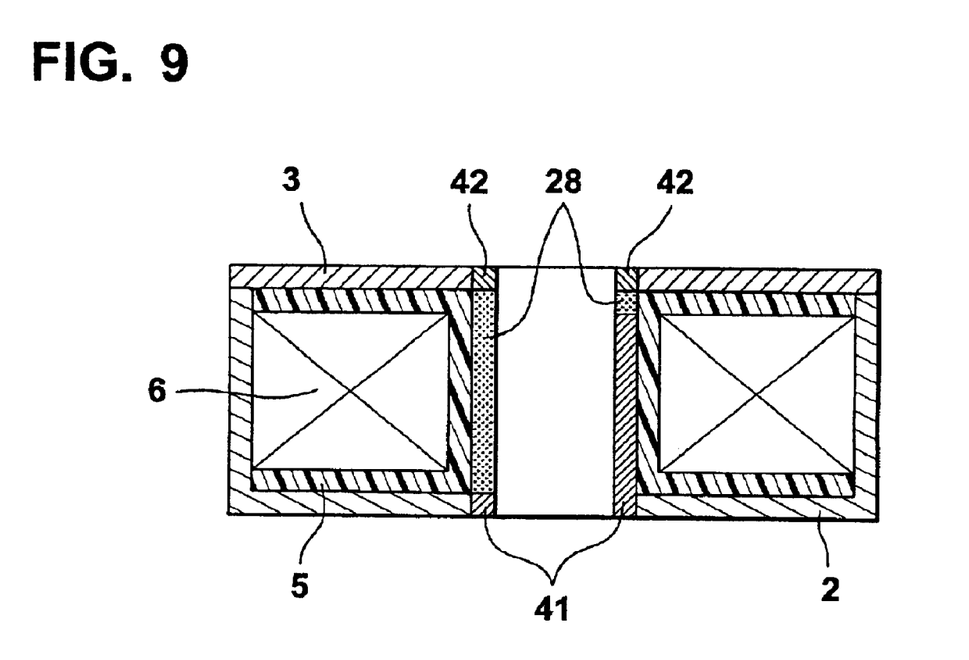
FIG. 9 is a cross-sectional view of a stator for explaining a manner of constructing the stator structure using an insert mold.

FIG. 9 is a cross-sectional view showing a stator structure of the present invention for explaining another method of assembling the stator according to the present invention.

In FIG. 9, a bobbin 5 wound with a coil 6, an inner yoke 3, an outer yoke 2 and pole tooth sections 41 and 42 are assembled into a unit of stator as illustrated. In this stator, mold resin 28 is poured into the pole tooth sections 41 and 42 with an insert molding machine using a press jig or the like (not shown). In this way, it makes it possible to fix the pole tooth sections 41 and 42 to the outer yoke 2 and the inner yoke 3.

If such an insert mold is used, it is possible to fix the pole tooth sections to the yokes, respectively, without mechanical attachment or welding.

Furthermore, with reference to the shape of the stator structure, the stator structure does not have to be always cylindrical in order to function as a miniature motor. As long as a rotor magnet fits into a limited gap, it also makes it possible for the stator structure to be rectangular or elliptical. Accordingly, it is possible to try any scheme such as making the shape rectangular to secure more space inside the stator, and injecting mold resin into this more secured space to fix an A-phase stator 15 to a B-phase stator 16, in order to improve the heat radiating characteristics.

What is claimed is:

1. A claw-pole type stepping motor comprising:
    a stator in which coils are arranged;
    a yoke unit made of soft magnetic steel and consisting of an inner yoke and an outer yoke,
    each inner yoke and outer yoke having a round hole at its center, and opposing pairs of inner and outer pole tooth sections made of soft magnetic steel thereby forming a magnetic circuit;
    each of said opposing pairs of pole tooth sections being prepared discretely by punching out a soft magnetic strip steel plate so as to form a toothed piece which has a belt portion and a plurality of pole teeth arrayed in a straight line in a longitudinal direction of said belt portion at a regular interval and integrally connected to said belt portion and then by rolling said toothed piece into a cylindrical shape with its both ends detachably jointed to each other at a joint to dispose said opposing pairs of pole tooth sections in a corresponding cylindrical shape; and,
    a rotor magnet rotatably disposed opposite to said pair of pole tooth sections of said stator.

2. A claw-pole type stepping motor according to claim 1, wherein:
    each of said opposing pair of pole tooth sections is inserted into said round hole of each of said inner and outer yokes and is fixed to an inner circumferential surface defined in said round hole of each of said yokes.

3. A claw-pole type stepping motor according to claim 2, wherein:
    each of said opposing pair of pole tooth sections is fixed by press-fitting to the inner circumferential surface defined in said round hole of each of said yokes.

4. A claw-pole type stepping motor according to claim 2, wherein:
    each of said pair of pole tooth sections is fixed by welding to the inner circumferential surface defined in said round hole of each of said yokes.

5. A claw-pole type stepping motor according to claim 2, wherein:
    each of said pair of pole tooth sections is fixed by resin molding to the inner circumferential surface defined in said round hole of each of said yokes.

6. A claw-pole type stepping motor according to claim 1, wherein:
    protuberances are formed at an inner circumferential surface defining said round hole of each of said yokes,
    the protuberances engaging fixedly with portions of each of the pole tooth sections when joined to the yokes.

7. A claw-pole type stepping motor according to claim 1, wherein:
    protuberances are formed at appropriate places of an inner circumferential surface defining said round hole of each of said yokes to extend toward a center of said round hole; and,
    notches are formed at corresponding places at a side of said belt portion of each of said pole tooth sections opposite to another side of said belt portion where said plurality of pole teeth are formed, whereby said protuberances engage fixedly with said notches when joining said yokes with said pole tooth sections.

8. A claw-pole type stepping motor according to claim 1, wherein:
    notches are formed at appropriate places of the inner circumferential surface defining said round hole of each of said yokes, and
    protuberances are formed at appropriate places of a side of said belt portion of each of said pole tooth sections opposite to another side of said belt portion where said plurality of pole teeth are formed, whereby said protuberances fixedly engage said notches when joining said yokes with said pole tooth sections.

9. A claw-pole type stepping motor according to claim 7, wherein:
    said protuberances and said notches are respectively formed at at least two places diametrically opposed so as to engage with each other.

10. A claw-pole type stepping motor according to claim 8, wherein:
    said notches and said protuberances are respectively formed at at least two places diametrically opposed so as to engage with each other.

11. In a stepper motor having a stator in which coils are arranged in association with a yoke unit made of soft magnetic steel and consisting of an inner yoke and an outer yoke, each yoke having a round hole at its center, and a pair of pole tooth sections for the inner yoke and the outer yoke respectively, the pole tooth sections each made of soft magnetic steel to thereby form a magnetic circuit, and a rotor magnet which is rotatably disposed opposite to the pair of pole tooth sections of the stator,
    a process of constructing and mounting each of the pair of pole tooth sections to the inner and outer yokes comprising the steps of:
        providing a soft magnetic strip steel plate for each of the inner and outer yokes;

punching out from the soft magnetic strip steel plate a belt portion and a plurality of pole teeth integrally connected to the belt portion for forming the pole tooth sections of the inner and outer yokes;

rolling each of the inner and outer yokes at the belt portion into a cylindrical shape to produce a pair of inner and outer pole tooth sections made of soft magnetic steel protruding from the belt portions;

joining the belt portions of each belt at a joint;

providing an inner yoke having a round hole at its center;

providing an outer yoke having a round hole at its center;

placing the inner yoke pole tooth section into the round hole of the inner yoke at the belt;

placing the outer yoke pole tooth section into the round hole of the outer yoke at the belt to construct and mount each of the pair of pole tooth sections of the stepper motor.

12. The process of constructing and mounting each of the pair of pole tooth sections according to claim 11 and wherein the step of placing each of the pole tooth sections includes:

placing the yoke pole tooth sections to an inner circumferential surface defined by the round hole of each of the yokes.

13. The process of constructing and mounting each of the pair of pole tooth sections according to claim 12 and wherein the step of placing each of the pole tooth sections includes:

press-fitting the pole tooth sections into the round holes.

14. The process of constructing and mounting each of the pair of pole tooth sections according to claim 12 and wherein the step of placing each of the pole tooth sections includes:

welding the pole tooth sections into the round holes.

15. The process of constructing and mounting each of the pair of pole tooth sections according to claim 11 and wherein the step of placing each of the pole tooth sections includes:

pouring mold resin into a gap in an assembled body of the yoke and the pole tooth section.

16. The process of constructing and mounting each of the pair of pole tooth sections according to claim 11 and wherein the step of providing an inner yoke having a round hole at its center and providing an outer yoke having a round hole at its center includes:

placing protuberances facing the inside of the round hole at appropriate places of the inner circumferential surface defining the round hole of each of the inner and outer yokes;

placing corresponding notches in the belt section of the inner and outer yokes;

engaging the protuberances of the round holes with each of the notches of the belt sections of the pole tooth sections when joining the yokes with the pole tooth sections.

17. The process of constructing and mounting each of the pair of pole tooth sections according to claim 11 and wherein the step of providing an inner yoke having a round hole at its center and providing an outer yoke having a round hole at its center includes:

placing notches facing the inside of the round hole at appropriate places of the inner circumferential surface defining the round hole of each of the inner and outer yokes;

placing corresponding protuberances in the belt section of the inner and outer yokes;

engaging the notches of the round holes with each of the protuberances of the belt sections of the pole tooth sections when joining the yokes with the pole tooth sections.

18. The process of constructing and mounting each of the pair of pole tooth sections according to claim 16 and wherein the step of providing an inner yoke having a round hole at its center and providing an outer yoke having a round hole at its center includes:

placing the protuberances and notches diametrically opposed.

19. The process of constructing and mounting each of the pair of pole tooth sections according to claim 17 and wherein the step of providing an inner yoke having a round hole at its center and providing an outer yoke having a round hole at its center includes:

placing the notches and protuberances diametrically opposed.

* * * * *